United States Patent [19]

Sohn et al.

[11] Patent Number: 5,530,450
[45] Date of Patent: Jun. 25, 1996

[54] RADAR SCAN CONVERTER FOR PPI RECTANGULAR AND PPI OFFSET RECTANGULAR MODES

[75] Inventors: Stephen M. Sohn, Shoreview; Douglas A. Peterson, Apple Valley, both of Minn.

[73] Assignee: Loral Corporation, New York, N.Y.

[21] Appl. No.: 371,257

[22] Filed: Jan. 11, 1995

[51] Int. Cl.⁶ .................................................. G01S 7/44
[52] U.S. Cl. ............................................ 342/185; 364/731
[58] Field of Search .................................... 342/185, 184; 364/731; 348/441, 442

[56] References Cited

U.S. PATENT DOCUMENTS

| | | | |
|---|---|---|---|
| 3,569,616 | 3/1971 | Baker | 178/6.8 |
| 3,633,173 | 1/1972 | Edge | 340/172.5 |
| 3,671,723 | 6/1972 | Delignieres et al. | 235/150.27 |
| 3,684,915 | 8/1972 | Gangawere | 315/23 |
| 3,727,217 | 4/1973 | Nirasawa | 343/5 |
| 3,737,120 | 6/1973 | Green | 244/3.17 |
| 3,765,018 | 10/1973 | Heard et al. | 343/5 |
| 3,774,202 | 11/1973 | Nolette | 343/5 |
| 3,797,014 | 3/1974 | Tompkins et al. | 343/5 |
| 3,798,425 | 3/1974 | Heard et al. | 235/150.27 |
| 3,810,174 | 5/1974 | Heard et al. | 343/5 |
| 3,838,420 | 9/1974 | Heard et al. | 343/5 |
| 3,904,817 | 9/1975 | Hoffman et al. | 178/6.8 |
| 4,002,827 | 1/1977 | Nevin et al. | 343/5 |
| 4,010,466 | 3/1977 | Hofstein | 343/5 |
| 4,065,770 | 12/1977 | Berry | 343/5 |
| 4,099,179 | 7/1978 | Hofstein | 343/5 |
| 4,106,021 | 8/1978 | Katagi | 343/5 |
| 4,128,838 | 12/1978 | Brands et al. | 343/55 |
| 4,220,969 | 9/1980 | Nitadori | 358/140 |
| 4,275,415 | 6/1981 | Engle | 358/140 |
| 4,364,048 | 12/1982 | Waters et al. | 343/5 |
| 4,369,441 | 1/1983 | Wohlmuth | 340/733 |
| 4,383,258 | 5/1983 | Morin | 343/5 |
| 4,412,220 | 10/1983 | Aanstoot et al. | 343/55 |
| 4,434,422 | 2/1984 | Kenol et al. | 343/5 |
| 4,434,437 | 2/1984 | Strolle et al. | 358/140 |
| 4,485,402 | 11/1984 | Searby | 358/160 |
| 4,547,803 | 10/1985 | Richards | 358/140 |
| 4,568,941 | 2/1986 | Thomas et al. | 343/5 |
| 4,673,929 | 6/1987 | Nelson et al. | 340/703 |
| 4,688,046 | 8/1987 | Schwab | 342/456 |
| 4,697,185 | 9/1987 | Thomas et al. | 342/185 |
| 4,700,181 | 10/1987 | Maine et al. | 340/747 |
| 4,729,029 | 3/1988 | Henri et al. | 358/183 |
| 4,745,475 | 5/1988 | Bicknell | 358/140 |
| 4,754,279 | 6/1988 | Cribbs | 342/185 |
| 4,774,516 | 9/1988 | Henri et al. | 342/185 |
| 4,827,432 | 5/1989 | Kasano | 364/518 |
| 4,829,455 | 5/1989 | Long et al. | 364/521 |
| 4,833,475 | 5/1989 | Pease et al. | 342/185 |
| 4,845,501 | 7/1989 | Pease et al. | 342/185 |
| 4,857,899 | 8/1989 | Ishii | 340/701 |
| 4,862,154 | 8/1989 | Gonzalez-Lopez | 340/747 |
| 4,873,515 | 10/1989 | Dickson et al. | 340/728 |
| 4,876,651 | 10/1989 | Dawson et al. | 364/449 |
| 4,931,801 | 6/1990 | Hancock | 342/185 |
| 4,954,819 | 9/1990 | Watkins | 340/721 |
| 4,970,636 | 11/1990 | Snodgrass et al. | 364/518 |
| 5,027,112 | 6/1991 | Ross et al. | 340/792 |
| 5,093,798 | 3/1992 | Kita | 364/518 |
| 5,097,268 | 3/1992 | Bauer, Jr. et al. | 342/160 |
| 5,227,895 | 7/1993 | Carlebach | 358/456 |
| 5,313,611 | 3/1994 | Franklin et al. | 395/425 |
| 5,315,305 | 5/1994 | Noll | 342/185 |
| 5,414,429 | 5/1995 | Giraudy | 342/185 |

FOREIGN PATENT DOCUMENTS 1103345  6/1981  Canada ................ 350/36

*Primary Examiner*—Ian J. Lobo
*Attorney, Agent, or Firm*—Glenn W. Bowen

[57] ABSTRACT

A process provides radar scan conversion from radar amplitude data in polar coordinates to rectangular coordinates by a digital computer which receives (r,θ) coordinate amplitude data from a radar receiver and which supplies (x,y) coordinate amplitude which covers a rectangular-shaped display area of a monitor display. A software program generates an aggregate radial scan pattern that consists of a plurality of radials each of which have active lengths that span one or more of a plurality of selected zones of the display such that as the average azimuthal resolution associated with each zone increases, the number of generated radials match the average azimuthal resolution of the display for each zone. The display can be generated as an offset display relative to the antenna center of a display that has no offset.

6 Claims, 3 Drawing Sheets

RADAR SCAN CONVERTER FOR PPI RECTANGULAR AND PPI OFFSET RECTANGULAR MODES

The implementation of the system described in copending patent application Ser. No. 08/318,952 entitled "Radar Scan Converter Using Multiple Azimuth Processing," filed Oct. 6, 1994, is shown in FIG. 2.

BACKGROUND OF THE INVENTION

The United States Government has a paid-up license in this invention and the right in limited circumstances to require the patent owner to license others on reasonable terms as provided for by the terms of Contract No. N00024-94-D-5204 awarded by the United States Navy.

1. Field of the Invention

The invention relates generally to high-speed coordinate scan conversion of radar coordinates for video presentation and more particularly to software programmed video coordinate conversion.

2. Description of the Background

Conventional radar displays consist of circular-shaped cathode ray tubes (CRT) in which a rotating beam is made visible by electron bombardment of a phosphor coating on a CRT screen. Targets can be identified on the screen as the beam rotates in synchronism with a rotating antenna. This type of display is known as a Plan Position Indicator (PPI).

A PPI display has a number of objectionable characteristics. Because of the fact that it relies on the persistence of a phosphor, there is an inherent lack of brightness. Thus, the early tubes could be viewed satisfactorily only under very low levels of ambient lighting, and refreshing of the PPI display occurred only once per revolution of the radar antenna, and it, therefore, was dependent on the radar revolution rate.

In order to overcome these deficiencies and to achieve other advantages, scan converters have been developed to convert the PPI information, which is a function of the radius (r) and the angle (θ) of the radial beam from a reference location to TV or computer screen monitors in which the (x) and (y) coordinates of the screen are used to determine the image. Scan converter systems allow for the integration of radar displays and with computer video recording techniques, including multiple color displays, overlapping windows and the capability of adding text to the display.

Numerous types of such systems have been developed for providing the conversion of the (r,θ) information into the (x,y) information. The great majority of these relied on relatively complex hardware-dominated systems for providing the scan conversion. In the past such complex hardware systems were required to achieve the fast speed needed to process the real-time information being received from the radar return.

Software algorithms for radar coordinate digital scan conversion have been developed, as shown in U.S. Pat. No. 4,697,185 entitled "Algorithm for Radar Coordinate Conversion and Digital Scan Converters," issued Sep. 29, 1987 to David M. Thomas et al., and U.S. Pat. No. 4,931,801 entitled "Method and Apparatus to Scan Convert Radar Video to Television Outputs," issued Jun. 5, 1990 to William R. Hancock. These algorithms were joined with specialized hardware to provide the desired (r,θ) to (x,y) scan conversion.

In the Thomas et al. patent it was noted that near the center or origin of a PPI display, the azimuthal resolution of the radar is greater than the resolution of the display, and, therefore, a number of (r,θ) points must be matched to the same (x,y) point. At long ranges in a PPI display, however, the radar resolution will often be less than that of the display. This results in a number of open areas in the display which have to be filled in. At intermediate ranges, the resolution of the radar and the display are approximately equal, and there may be a one-to-one mapping between the two coordinate systems.

In the Thomas et al. patent, look-up tables are utilized to hold sin and cos values to update the x and y values to the next consecutive coordinate of x and y values by adding a sin value to the x coordinate and a cos value to the y coordinate. In the Hancock patent look-up tables were also employed to control intensities of the display pixels. Look-up tables have also been employed in graphic displays to control colors of the image displayed.

A copending U.S. patent application Ser. No. 08/143,597, entitled "Programmed Radar Coordinate Scan Conversion" was filed on Nov. 1, 1993 and assigned to the assignee of this invention. The invention of this prior application was also directed to software programmed radar scan conversion. In the invention of this prior application, radar scan conversion from (r,θ) values employed in a PPI display are converted to (x,y) coordinates of a computer monitor by utilizing a digital computer which employs look-up tables, wherein the look-up tables are utilized in an algorithm which first computes an inverse mapping of the (x,y) coordinates of the monitor to the (r,θ) coordinates of the PPI display to fill the look-up table with values that link together the (x,y) points to the corresponding (r,θ) points.

During this mapping some of the (r,θ) points will not have been "hit" or converted. To complete the mapping process a second phase "forward mapping" is then performed which links the remaining (r,θ) coordinates which have not been mapped during the inverse mapping phase to (x,y) coordinates. Each table entry represents an image patch. The number of pixels in a patch varies according to the radial distance of the patch from the origin of the display to compensate for the differences between the resolution of the radar and the resolution of the display. Since the look-up table has been established, the algorithm relates the pre-defined patches to the coordinate points of the display.

In the present invention a process provides radar scan conversion from radar amplitude data in polar coordinates to rectangular coordinates by a digital computer which receives (r,θ) coordinate amplitude data from a radar receiver and which supplies (x,y) coordinate amplitude data to a monitor display. A software program generates an aggregate radial scan pattern that consists of a plurality of radials each of which have active lengths that span one or more of a plurality of selected zones of the display such that as the average azimuthal resolution associated with each zone increases, the number of generated radials match the average azimuthal resolution of the display for each zone.

FIG. 2 illustrates how the zones of a four-zone display may be arranged to satisfactorily partition an aggregate radial pattern. The segment shown in FIG. 2 is not to scale and in fact occupies much less of the screen 32 that is shown in FIG. 2 in order to illustrate the desired pattern with sufficient clarity. The scan pattern 30 may be divided into 0.1° angular segments or other suitable divisions so the segment is actually much smaller than is represented in FIG. 2.

Each segment has 8 radial or partial radials which form the aggregate radials. One radial of each segment 30 is radial 42 that is active through all four zones, region 0, region 1, region 2 and region 3. The zone is bisected in the embodiment shown in the FIG. 2, which is just one of a number of alternative ways the invention might be implemented. The radial that bisects scan pattern 30 is the radial 44 which extends through all of the ring zones, but not the central circular zone, or region 0.

There are two radials, 46 and 48, which bisect the portion of segment 30 between the radial 42 and the radial 44 and between the radial 44 and the radial 56, respectively, where the radial 50 is the start of the next segment when the scan rotates in a clockwise direction. The desired resolution of regions 0–2 is completed with the radials described thus far. The radials 52, 54, 56 and 58 bisect the remaining areas between the radials 42 and 46, 46 and 44, 44 and 48, 48 and 50, respectively, in order to complete the scan pattern of the outermost zone. In this manner, the number of scans in the aggregate scan are divided so that for each segment of the scan, zone 0 has 1 radial, zone 1 has 2 radials, zone 2 has 4 radials and zone 3 has 8 radials, thereby allowing the number of radials in each zone to match the average azimuthal resolution of the display in the zone mentioned. The circular center zone 0 desirably has the same azimuthal resolution of the radar, or as a pulse expanded or compressed version of the received radar pulses. The number of radials in each zone is desirably doubled in each zone, but other ratios may be employed, with or without pulse expansion or compression.

SUMMARY OF THE INVENTION

Radar scan conversion from radar amplitude data in polar coordinates to rectangular coordinates is obtained in a programmable digital computer which is supplied $(r,\theta)$ coordinate amplitude data and which in turn supplies a rectangular-shaped display area of a monitor display with $(x,y)$ coordinate amplitude data.

The digital computer is programmed to generate an aggregate radial scan pattern that consists of a plurality of radials each of which has active lengths that span one or more of a plurality of selected zones of said display. The zones are defined such that the average azimuthal resolution associated with each zone increases as the radius increases and the number of active radials in each zone match the average azimuthal resolution of the display for that zone. The display can be generated in an offset mode as well as a centered mode with respect to the antenna center of a display that has no offset.

BRIEF DESCRIPTION OF THE DRAWINGS

The invention is described by reference to the drawings in which.

DESCRIPTION OF THE PREFERRED EMBODIMENT

The present invention is achieved by programming a digital computer 24 which receives input data (line 22) from a radar receiver 10 to provide (line 26) a rotating display vector that is controlled by $(x,y)$ coordinates rather than by $(r,\theta)$ coordinates that are employed in a PPI display. The display is preferably rectangular to allow for a larger, useful display area on the rectangular face of the display. (In the following theta and $\theta$ may be used interchangeably to represent the coordinate angles.) The invention is preferably implemented without the modification of or the addition of any other hardware to a conventional computer or work station.

The algorithm may be implemented in a general purpose computer board or in a digital signal processor (DSP) board. It may be implemented with any type of programming, but preferably it will be implemented with high level programming language for ease of programming. However, assembly and machine-level programming could be employed to reduce memory requirements and to increase speed, if desired.

A radar scan converter transforms two-dimensional vectors from polar format $(r,\theta)$ to rectangular format $(x,y)$. A scanning radar emits pulses radially from a rotating transmit/receive antenna 12. The returned pulses, or echoes, are sampled in time to produce range and amplitude information for a given angular antenna position. At each angle $\theta$, as the antenna 12 steps in its rotation, the amplitude data for each range position, r, is temporarily stored in a register in a conventional manner. The computer 24, utilizing the invention, then converts this r, $\theta$ data to data which represents the amplitude of each of a series of x, y points of the display 28 that are associated with the $(r,\theta)$ data.

Figure 2:
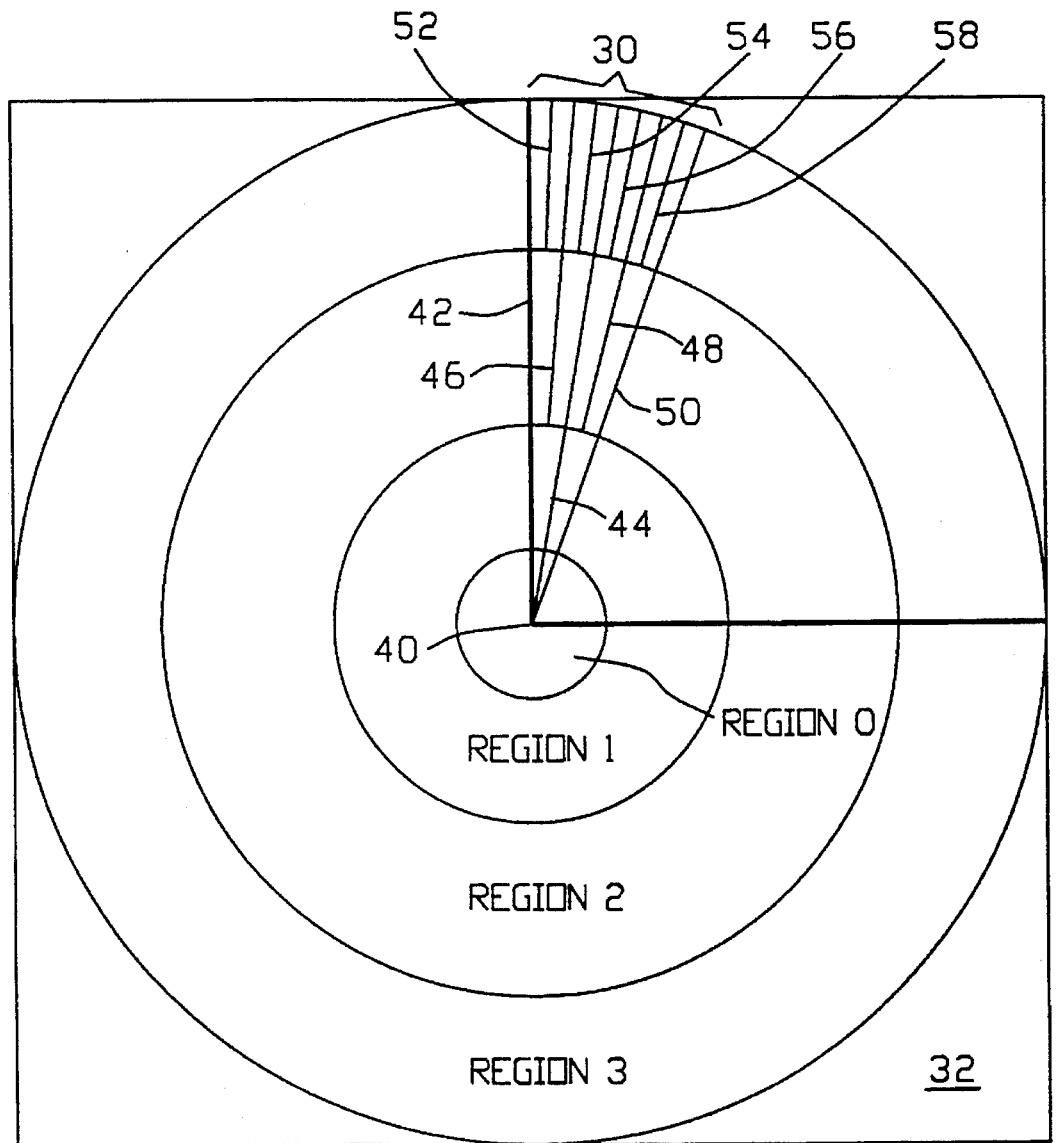
FIG. 2 is a block diagram of a system which shows the multi-resolution scan pattern of the invention on a PPI radar display.
Figure 2:
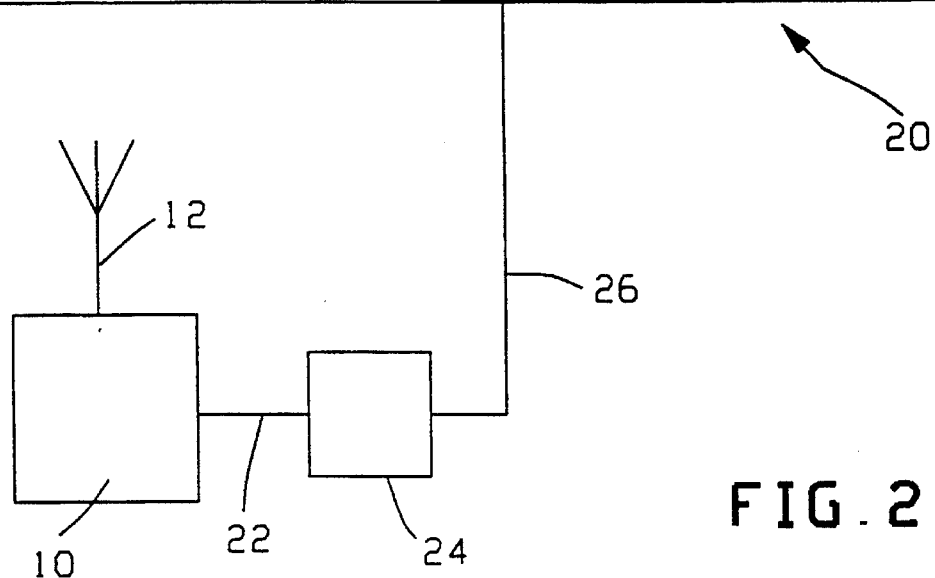

The pixels of contemporary graphical display devices are addressed by row and column indices. Hence, the radar data must be scan converted from the polar format to the pulse data to the rectangular format of the display pixels. One common presentation of the radar data on the display is a circular sweeping display known as the Plan Position Indicator (PPI) mode. In a centered PPI mode, the antenna position is fixed at the center of the display. It is sometimes desirable to display a region of interest which is not centered around the antenna position. For example, a radar system operator might wish to devote the entire display to, say, the southeast quadrant with respect to the antenna since targets under observation are within that quadrant. This mode is denoted as offset PPI mode. FIG. 2 diagrammatically illustrates both the centered and offset PPI mode. The offset mode is equivalent to a movable window that is positioned around the region of interest within the overall coverage volume of the radar system, as shown in FIG. 2.

The mathematical technique for transforming a vector from polar format to rectangular format is well known. A given pulse to be displayed comprises an antenna angle and a collection of amplitude values usually stored in increasing range from minimum range to maximum range. An amplitude value corresponds to the echo intensity at a given range.

In the following description initially an algorithm for painting a single radial on the display is discussed. The difficulties of producing a satisfactory display are then addressed. Next, algorithms are presented for calculating values which define the boundaries of the window surrounding the offset region of interest. Finally, an algorithm is described which paints a radial in offset mode. An offset PPI mode display is produced by using this later algorithm repeatedly for the pulse data within the region of interest. The offset PPI mode algorithm includes the centered PPI mode algorithm as a special case by using an offset of (0,0). Therefore, it can be used without modification for both modes.

A single radial can be painted on the display 32 by the algorithm written in the C programming language shown in Table 1 below.

This PaintRadial() algorithm was derived by using the following assumptions:

Let θ be the antenna angle in radians measured clockwise from north.

Let the amplitude of the echo at range r be written a[r].

Let $r_{min}$ ($r_{max}$) be the minimum (maximum) range to be displayed of the totality of range cells comprising the pulse.

Let ($x_c, Y_c$) be the pixel coordinates of the center of the display. The display is addressed such that pixel (0,0) is at the upper left of the display, with the x-axis extending horizontally and the y-axis extending vertically. With respect to the radar antenna, north is positioned at the top of the display.

Let sin() and cos() denote the standard sine and cosine mathematical functions, and let irint() denote a function which rounds a floating point value to the nearest integer.

This function uses another function, PaintPixel(x,y,b), which stores b as the amplitude of the pixel on the display at coordinates (x,y). (The variable b represents the amplitude of a particular pixel while a[] represents amplitude defined by an array.) The PaintPixel() function is hardware dependent and is merely the conventional process that displays the amplitude of pixels defined by the coordinates x,y for the display employed.

By repeatedly using this function with the appropriate antenna position and pulse amplitude data as the antenna rotates, a circular centered PPI radar display will be produced. (Note that the sin() and cos() calculations need not be repeated for subsequent rotations if the values are stored in a table.)

TABLE 1

```
1   Paint Radial(θ, a, rmin, rmax, xc, yc)
2   float    θ;
3   int      a[], rmin, rmax, yc;
4   {
5        float    s, c, x, y;
6        int      r;
7
8        s = sin(θ) ;
9        c = cos(θ) ;
10       x = xc + rmin · s;
11       y = yc - rmin · c;
12       for (r = rmin; r < = rmax; r++) {
13            PaintPixel(irint(x), irint(y), a[r]);
14            x = x + s;
15            y = y - c;
16       }
17  }
```

A line-by-line commentary on the algorithm PaintRadial() is given below:

1. Defines the calling syntax of the function.
2. The parameter θ is a floating point number.
3. The remaining parameters are integers, with the exception of a[] being an array of integers.
4. The function body begins here.
5. s, c, x, y are local floating point variables used in the function.
6. r is a local integer variable used in the function.
7. Blank.
8. s is assigned the sine of θ.
9. c is assigned the cosine of θ.
10. x is assigned the center of the display along the x-axis ($x_c$) plus an offset along the x-axis depending on the starting range of the pulse to be displayed.
11. y is assigned the center of the display along the y-axis ($Y_c$) minus an offset along the y-axis depending on the starting range of the pulse to be displayed.
12. A loop of instructions is established with r denoting the range of pulse amplitude values going from $r_{min}$ to $r_{max}$ inclusively.
13. The floating point coordinates are converted to integer coordinates for painting a pixel on the display with the appropriate range amplitude value.
14. The x coordinate is incremented along the x-axis by the sine of θ.
15. The y coordinate is decremented along the y-axis by the cosine of θ.
16. The loop ends here.
17. The function body ends here.

The azimuthal resolution of a rotating radar may be defined as the number of pulses transmitted and received per complete rotation of the antenna. Contemporary radars have azimuthal resolutions from less than 360 to more than 10,000. The azimuthal resolution depends on the pulse repetition frequency (PRF), or number of pulses transmitted/ received per second, and the rotation rate of the antenna, usually specified in rotations per minute (RPM).

The appearance of a radar system display having a low azimuthal resolution which used only the PaintRadial() function would be unsatisfactory due to the appearance of holes near the periphery of the display. This is sometimes called "spoking." The actual radar beam diverges in azimuth with range, yet the radial painted by this function is exactly one pixel wide over all ranges.

The azimuthal resolution required to produce a hole-free display depends on range. The required azimuthal resolution at range r is bound below by 2πr, which is seen to be the circumference of a circle of radius r. The object of this invention is an algorithm for painting radials at an appropriate range-varying azimuthal resolution to efficiently produce a satisfactory hole-free display.

Considering processing efficiency, it is impractical to paint a different resolution at every range. However, it is practical to segment the range extent into a few regions, and paint the corresponding resolution within each region. A partitioning of the range extent into four resolution regions achieving a 1024×1024 (1K×1K) hole-free display is shown in Table 2 below.

Table 2

| Region | Start Range | Stop Range | Azimuthal Resolution |
|---|---|---|---|
| 0 | 1 | 168 | 2K |
| 1 | 169 | 312 | 4K |
| 2 | 313 | 602 | 8K |
| 3 | 603 | edge of display | 16K |

Figure 1:
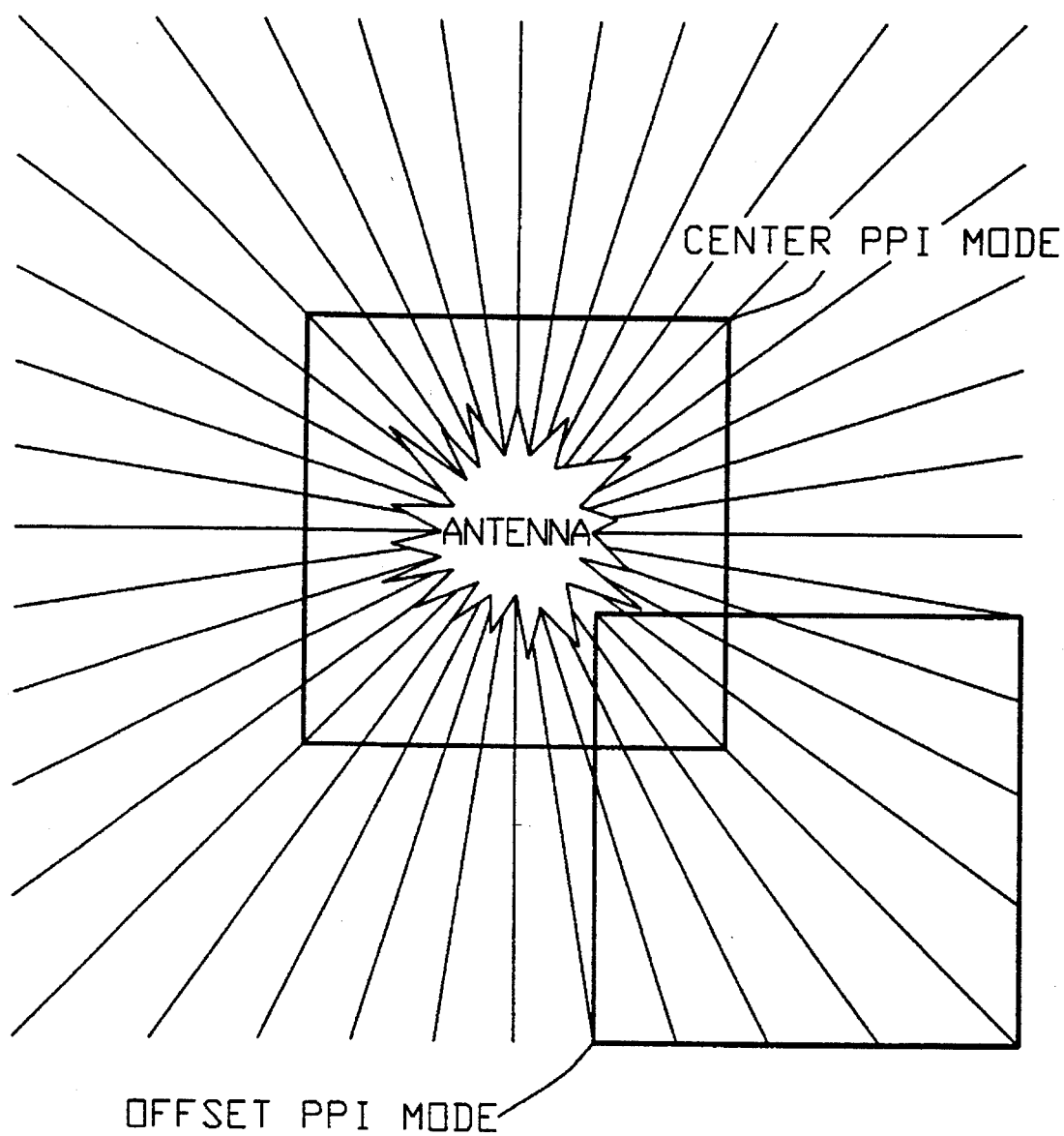
FIG. 1 is a diagrammatic illustration of both a centered and offset PPI screen mode.

This partitioning is advantageous for a variety of reasons and is only 33% less efficient (in the number of pixels painted) than the theoretical best partitioning consisting of a different resolution at every range. A representation of the segmentation of the range extent into four regions is given in the FIG. 1.

A radial composed of multiple sub-radials at different resolutions is denoted as an aggregate radial. The azimuthal resolution is highest at the periphery of the display and lowest near the center. The processing system generates an aggregate radial from a series of pulses in two steps:

1. A sequence of pulses is expanded or compressed by known techniques to match the azimuthal resolution of the display region according to range.
2. An aggregate radial comprising multiple subradials is scan converted and painted on the display by the PaintOffsetAggregateRadial() algorithm shown in Table V below.

In the offset PPI radar mode, typically not all radials pass within the display window. The window will, therefore, have a minimum and maximum azimuth. Furthermore, each radial that passes within the window will have minimum and maximum range boundaries corresponding to where the radial enters and exits the window, respectively.

Figure 3:
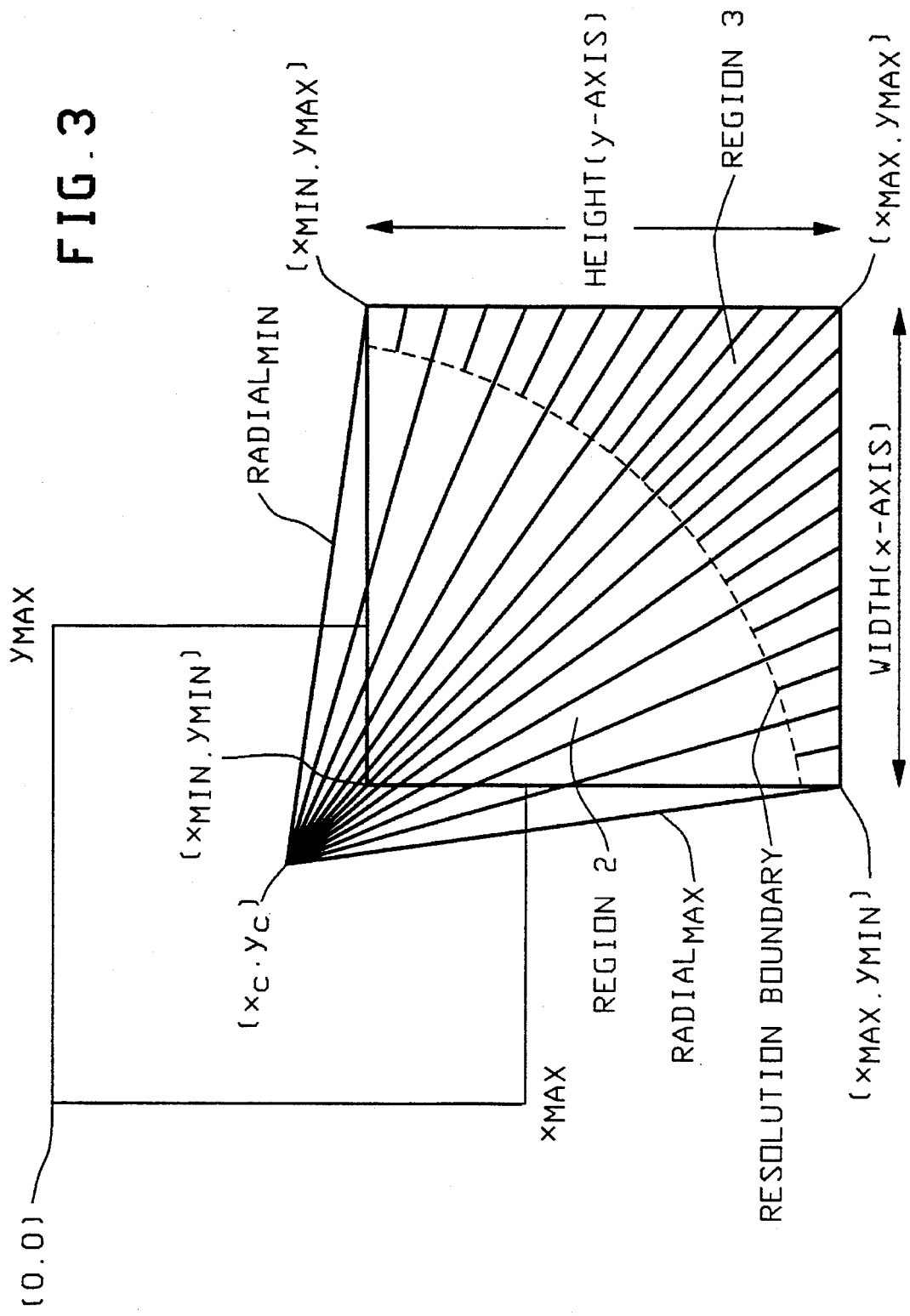
FIG. 3 is a diagrammatic illustration of the parameters used in offset PPI screen mode.

The offset parameters are shown in FIG. 3 and are further defined as:

$x_c$ is defined as the width of the display divided by two.

$y_c$ is defined as the height of the display divided by two.

$(x_{min}, Y_{min})$ is the offset of the window from the upper left hand corner of the display. An offset of (0,0) corresponds to centered PPI mode. Each component of the offset may be a positive or negative integer.

$radial_{min}$ defines the leading edge of the window (going clockwise from north). $radial_{max}$ defines the trailing edge of the window. If the display window includes the antenna position, then $radial_{min}=0$ and $radial_{max}=$the azimuthal resolution of the outermost region$-1$.

$x_{max}=x_{min}+width-1$.

$y_{max}=y_{min}+height-1$.

In the following discussion, it is assumed that the regions and their boundaries are such that the finest, or outermost, azimuthal resolution is 16K, and the display is rectangular, thereby providing a larger display area relative to a circular area within the boundaries of the display. The azimuthal resolution of the assumed radar system is 2K.

It is sometimes more efficient to do the mathematical calculations by representing the position of a radial as an index or as an angle. The radial number of a given radial may be defined by its position measured clockwise from north in a range of radials numbered from 0–16383 inclusively, (16383=16K−1) where the north pointing radial has radial number 0. In the following C-language code, a variable denoting a radial number will be written as a variant of the name radial, and the azimuth of a given radial is its angle in radians. In the following code a variable denoting an azimuth will be written as θ.

The function RadialRangeBounds() is shown in Table II and a line-by-line commentary follows. RadialRangeBounds() computes the range boundaries for a given radial with azimuth θ. The lower boundary is the range at which the radial enters the window, while the upper boundary is the range at which the radial exists the window. These ranges lie within the window.

Additional assumptions and definitions regarding the function RadialRangeBounds() are:

θ is an angle in radians.

$x_{min}$, $x_{max}$, $y_{min}$, $y_{max}$, $x_c$ and $y_c$ are defined above.

$r_{maxmax}$ is a large number which is greater than the maximum range of any pulse range cell to be displayed.

The function will store the computed values into the locations pointed at by lower and upper. This feature of the C programming language will be recognized by those familiar with the syntax and semantics of the C-language or its variants.

TABLE II

RadialRangeBounds Algorithm

```
1   RadialRangeBounds(θ, lower, upper, x_min, x_max, y_min,
        y_max, x_c, y_c, r_maxmax)
2   float  θ;
3   int    *lower, *upper, x_min, x_max, y_min, y_max, x_c, y_c, r_maxmax;
4   {
5        float  s, c, x, y;
6        int    r;
7
8        r = 0;
9        s = sin(θ);
10       c = cos(θ);
11       x = x_c;
12       y = y_c;
13       do {
14            x = x + s;
15            y = y − c;
16            r = r + 1;
17       } while (!(irint(x) ≥ x_min && irint(x) ≤ x_max &&
18            irint(y) ≥ y_min && irint(y) ≤ y_max) && r ≤
                 r_maxmax);
19       *lower = r;
20       do {
21            x = x + s;
22            y = y − c;
23            r = r + 1;
24       } while (irint(x) ≥ x_min && irint(x) ≤ x_max &&
25            irint(y) ≥ y_min && irint(y) ≤ y_max && r ≤
                 r_maxmax);
26       *upper = r − 1;
27  }
```

Comments on the Function RadialRangeBounds( )
1. Defines the calling syntax of the function.
2. The parameter θ is a floating point number.
3. The remaining parameters are integers, with the exception of *lower and *upper being pointers to integers.
4. The function body begins here.
5. s, c, x, y are local floating point variables used in the function.
6. r is a local integer variable used in the function.
7. Blank.
8. r is assigned zero.
9. s is assigned the sine of θ.
10. c is assigned the cosine of θ.
11. x is assigned the center of the display along the x-axis ($x_c$).
12. y is assigned the center of the display along the y-axis ($y_c$).
13. A loop of instructions is established. The loop is guaranteed to be executed at least once, and exits when the condition in lines 17–18 becomes false.
14. The x coordinate is incremented along the x-axis by the sine of θ.
15. The y coordinate is decremented along the y-axis by the cosine of θ.
16. The range variable, r, is incremented.
17. The loop is exited when the pixel position (x, y) enters the window defined by $x_{min}$, $x_{max}$, $y_{min}$ and $y_{max}$, or when the range exceeds a large value($r_{maxmax}$).
18. 17. continued.
19. The range where the pixel entered the window is stored into the location pointed at by lower.
20. A loop of instructions is established. The loop is guaranteed to be executed at least once, and exits when the condition in lines 24–25 becomes false.
21. The x coordinate is incremented along the x-axis by the sine of θ.
22. The y coordinate is decremented along the y-axis by the cosine of θ.
23. The range variable, r, is incremented.
24. The loop is exited when the pixel position (x, y) exits the window defined by $x_{min}$, $x_{max}$, $y_{min}$ and $y_{max}$, or when the range exceeds a large value ($r_{maxmax}$).
25. 24. continued.
26. The range where the pixel exited the window is stored into the location pointed at by upper.
27. The function body ends here.

The function Azimuth Bounds() computes the azimuthal extent of the window, namely, radial$_{min}$ and radial$_{max}$. This function and a line-by-line commentary are given below. The assumptions for this function are:

The function computes two values, radial$_{min}$ and radial$_{max}$, which are stored in locations pointed at by the corresponding pointer variables of the same name.

The function atan2(a,b) is defined at tan$^{-1}$(a/b) incorporating the correction for the signs of a and b.

Let max(a,b) (min(a,b)) denote the mathematical function computing the maximum (minimum) of a and b.

The symbol "%" denotes the modulus operator as defined in the C programming language.

TABLE III

AzimuthBounds Algorithm

```
1   AzimuthBounds(radial_min, radial_max, x_min, x_max, y_min, y_max, x_c, y_c)
2   int *radial_min, *radial_max, x_min, x_max, y_min, y_max, x_c, y_c;
3   {
4       int radial_xminymin, radial_xmaxymin, radial_xminymax, radial_xmaxymax,
5       Δx_min, Δx_max, Δy_min, Δy_max;
6
7       Δx_min = x_min − x_c;
8       Δx_max = x_max − x_c;
9       Δy_min = y_min − y_c;
10      Δy_max = y_max − y_c;
11      radial_xminymin = irint((π + atan2(−Δx_min, Δy_min)) · 16384.0/(2.0 · π))%16384;
12      radial_xmaxymin = irint((π + atan2(−Δx_max, Δy_min)) · 16384.0/(2.0 · π))%16384;
13      radial_xminymax = irint((π + atan2(−Δx_min, Δy_max)) · 16384.0/(2.0 · π))%16384;
14      radial_xmaxymax = irint((π + atan2(−Δx_max, Δy_max)) · 16384.0/(2.0 · π))%16384;
15      if(x_min ≤ x_c && x_max ≥ x_c && y_min ≤ y_c && y_max ≥ y_c) {
16          *radial_min = 0;
17          *radial_max = 16383;
18      }
19      else if(x_min ≤ x_c && x_max ≥ x_c && y_max < y_c) {
20          *radial_min = radial_xminymax;
21          *radial_max = radial_xmaxymax;
22      }
23      else {
24          *radial_min = min(min(radial_xminymin, radial_xmaxymin),
25                            min(radial_xminymax, radial_xmaxymax));
26          *radial_max = max(max(radial_xminymin, radial_xmaxymin),
27                            max(radial_xminymax, radial_xmaxymax));
28      }
29  }
```

Comments on the Function AzimuthBounds( )
1. Defines the calling syntax of the function.
2. The parameters are integers, with the exception of *radial$_{min}$ and *radial$_{max}$ being pointers to integers.
3. The function body begins here.
4. These are local integer variables used in the function.
5. 4. continued.
6. Blank.
7. Δx$_{min}$ is assigned the difference between x$_{min}$ and the center of the display along the x-axis (x$_c$).
8. Δx$_{max}$ is assigned the difference between x$_{max}$ and the center of the display along the x-axis (x$_c$).
9. Δy$_{min}$ is assigned the difference between y$_{min}$ and the center of the display along the y-axis (y$_c$).
10. Δy$_{max}$ is assigned the difference between y$_{max}$ and the center of the display along the y-axis (y$_c$).
11. radial$_{x_{min}y_{min}}$ is assigned the number, 0–16383, of the radial passing through the pixel at the corner of the window (x$_{min}$, y$_{min}$).
12. radial$_{x_{max}y_{min}}$ is assigned the number, 0–16383, of the radial passing through the pixel at the corner of the window (x$_{max}$, y$_{min}$).
13. radial$_{x_{min}y_{max}}$ is assigned the number, 0–16383, of the radial passing through the pixel at the corner of the window (x$_{min}$, y$_{max}$).
14. radial$_{x_{max}y_{max}}$ is assigned the number, 0–16383, of the radial passing through the pixel at the corner of the window (x$_{max}$, y$_{max}$).
15. If the window includes the center of the display, (x$_c$, y$_c$), then the radial boundaries are set to include the entire azimuth extent.
16. 15. continued.
17. 15. continued.
18. 15. continued.

TABLE III-continued

19. If the window does not include the center of the display, but does include part of radial 0, then the boundaries are set to the radial numbers of the lower left hand and lower right hand corners of the window.
20. 19. continued.
21. 19. continued.
22. 19. continued.
23. Otherwise, the minimum radial is assigned the minimum of the four corner radials, and the maximum radial is assigned the maximum of the four corner radials.
24. 23. continued.
25. 23. continued.
26. 23. continued.
27. 23. continued.
28. 23. continued.
29. The function body ends here.

The function RangeBounds() shown in Table IV calls the two functions RadialRangebounds() and AzimuthBounds() previously defined. The purpose of this function is to compute the range bounds for all of the radials within the window. Two arrays of values are computed within this function: $r_{min}[]$ and $r_{max}[]$. The sizes of these arrays are 16K entries each. Assume that these arrays have been initialized to zero prior to calling this function. For some applications, the arrays will contain a large number of unneeded values, since not all radials will necessarily pass through the window.

TABLE IV

RangeBounds Algorithm

```
1   RangeBounds(x_min, y_min, width, height, r_min, r_max,
              r_maxmax)
2   int      x_min, y_min, width, height, r_min[ ], r_max[ ],
              r_maxmax;
3   {
4       float   θ;
5       int     radial, radial_min, radial_max, x_max,
                y_max, x_c, y_c;
6
7       x_c = width / 2;
8       y_c = height / 2;
9       x_max = x_min + width - 1;
10      y_max = y_min + height - 1;
11      AzimuthBounds(&radial_min, &radial_max, x_min,
                x_max, y_min, y_max, x_c, y_c)
12      for (radial = radial_min; radial ≦ radial_max;
                radial++) {
13          θ = radial · 2.0 · π / 16384.0;
14          RadialRangeBounds(θ, &r_min[radial],
                &r_max[radial],
15              x_min, x_max, y_min, y_max, x_c, y_c,
                r_maxmax);
16      }
17  }
```

Comments on the Function RangeBounds( )
1. Defines the calling syntax of the function.
2. The parameters are integers, with the exception of $r_{min}[ ]$ and $r_{max}[ ]$ which are arrays of integers.
3. The function body begins here.
4. θ is a local floating point variable used in the function.
5. These are local integer variables used in the function.
6. Blank.
7. $x_c$ is the center of the display along the width.
8. $y_c$ is the center of the display along the height.
9. $x_{max}$ is the maximum x-coordinate of the window.
10. $y_{max}$ is the maximum y-coordinate of the window.
11. The function AzimuthBounds( ) is called to

TABLE IV-continued compute the first and last radials (measured clockwise) passing through the corners of the window, $radial_{min}$ and $radial_{max}$, respectively.
12. A loop of instructions is established with radial denoting the radial number going from $radial_{min}$ to $radial_{max}$, inclusively. This loop will compute the ranges where these radials pass into and out of the window.
13. θ is assigned the angle in radians of the given radial.
14. The function RadialRangeBounds( ) computes the two ranges, $r_{min}[radial]$ and $r_{max}[radial]$, where the radial passes into and out of the window, respectively.
15. 14. continued.
16. The loop ends here.
17. The function body ends here.

In general the azimuthal resolution of the radar will be different than the azimuthal resolution of the display regions. Hence, it sometimes is necessary to combine pulses or to paint a pulse multiple times. If the azimuthal resolution of the display region is less than the azimuthal resolution of the radar, a sequence of pulses is combined to yield a single pulse prior to painting the display. One way of doing this is to combine adjacent pulse fragments by computing the maximum of corresponding range cell amplitudes. This is sometimes called peak detection since it ensures that a detected target with a sufficiently high amplitude value is painted on the display.

Consider a hypothetical radar system with either an inherent azimuthal resolution of 2K or one in which the radial pulses have been expanded or compressed to correspond to such resolution. In region 0, the incoming pulse stream is scan converted and painted directly since region 0 has the same azimuthal resolution. In region 1 the display resolution requires that each pulse be painted twice: at the normal azimuth and at an azimuth exactly between the normal azimuths. In region 2 each pulse is painted four times (since region 2 has an azimuthal resolution of 8K). These are at the normal azimuth and at three intervening azimuths. Finally, in region 3 each pulse is painted eight times. These are at the normal azimuth and at seven intervening azimuths.

The function PaintOffsetAggregate Radial() is given in Table V below. This function will paint a multi-resolution radial for a given θ. It is assumed that RangeBounds() has been called previously to initialize $r_{min}[]$ and $r_{max}[]$. This function is then repeatedly called with radial=i·8 for integer i such that 0≦i<2048. These are the radial numbers of the 2K antenna positions. The corresponding pulse amplitude array a[] must be provided for each θ.

TABLE V

```
1   PaintOffsetAggregateRadial
        (radial, a, r_min, r_max, x_min, y_min, x_c, y_c)
2   int     radial,a[], r_min[], r_max[], x_min, x_max, x_c, y_c);
3   {
4           int     radialΔ, radial_next, region, i,
5                   region_r_min = {1, 169, 313, 603},
6                   resolution = {2048, 4096, 8192,
                        16384};
7           float   θ;
8
9           θ = radial·2.0·π/16384.0;
10          region = 0;
11          PaintRadial(θ, a, r_min[radial], r_max[radial],
                    x_c − x_min, y_c − y_min);
12          for (region = 1; region < 4; region++){
13              radialΔ =16384/
                        resolution[region];
14              radial_next = radial + radialΔ;
15              for (i = 0; i <
                        resolution[region] / 4096;
                        i++) {
16                  θ = radial_next
                        ·2.0·π/16384.0;
17                  PaintRadial(θ, a,
                        max(region_r_min[region],
                        r_min[radial_next]),
18                      r_max[radial_next],
                        x_c − x_min,
                        y_c − y_min);
19                  radial_next = radial_next
                        + 2·radialΔ;
20              }
21          }
22  }
```

Comments on the Function PaintOffsetAggregateRadial()
are as follows:

1. Defines the calling syntax of the function.
2. The parameters are integers, with the exception of a[], $r_{min}[]$ and $r_{max}[]$ being arrays of integers.
3. The function body begins here.
4. radialΔ, $radial_{next}$, region and i are local integer variables used in the function.
5. region_$r_{min}$ is an array of four integers denoting the start ranges of the four resolution regions.
6. resolution is an array of four integers denoting the azimuthal resolutions of the four regions.
7. θ is a local floating point variable.
8. Blank.
9. θ is assigned the angle in radians corresponding to the radial number radial.
10. region is assigned zero.
11. A radial is painted from $r_{min}$[radial] to $r_{max}$[radial]. The origin of the radial is ($x_c$−$x_{min}$, $y_c$−$y_{min}$).
12. A loop of instructions is established with region denoting the range of regions going from 1 to 3 inclusively. This loop will paint the higher resolution radials.
13. radialΔ is assigned the number of highest resolution radials which separate painted radials for this resolution region.
14. The number of the next radial to paint, $radial_{next}$, is assigned the number of the base radial plus the number of separating radials.
15. A loop of instructions is established with radial denoting the number of radials to paint for this region, going from 0 to resolution[region]/4096 inclusively.
16. θ is assigned the angle corresponding to the radial number.
17. A radial is painted from the greater of the start of the resolution region and $r_{min}$[$radial_{next}$], to $r_{max}$[$radial_{next}$]. The origin of the radial is ($x_c$ −$x_{min}$, $y_c$−$y_{min}$).

TABLE V-continued 18. 17. continued.
19. The number of the next radial to paint for this resolution region is incremented by twice radialΔ.
20. The loop for painting radials in a given resolution region ends here.
21. The loop through resolution regions 1–3 ends here.
22. The function body ends here.

FIG. 3 is a diagrammatic drawing that illustrates the operation of the invention on a rectangular display area. The similarity between the radial lines of FIGS. 2 and 3 is made apparent by comparison of the drawings. In FIG. 2 the radials are shown in a segment 30 which represents a small angular portion of the circular zone area. This segment 30 represents a radial pattern that is repeated as the scan rotates around the circle. The segment 30 is not to scale and in fact occupies much less of the screen than is shown in FIG. 2 in order to illustrate the desired pattern with sufficient clarity. The scan pattern may be divided into 0.1° angular segments or other suitable divisions so the segment is actually much smaller than is represented in FIG. 2.

The illustration of FIG. 3 represents an offset rectangular display area. In order to illustrate the operation of the invention, the radial extending between $x_c$, $y_c$ and $x_{min}$, $y_{max}$ is labeled $radial_{min}$, and the radial extending between $x_c$, $y_c$ and $x_{max}$, $y_{min}$ is labeled $radial_{max}$.

In FIG. 3 the radials between $radial_{min}$ and $radial_{max}$ are shown as proceeding across the entire surface area. Every other radial is pictured as extending from the perimeter of the display area to the boundary of the other region, which is designated region 3 for discussion purposes and for reference to FIG. 2. Three azimuth zones are assumed for the display of FIG. 3 to held describe operation of the invention. The inner region is designated region 2 in correspondence with region 2 of FIG. 2. The offset center point is designated $x_{min}$, $y_{min}$ and if positioned in the circular display of FIG. 2 would appear in zone 2.

For this reason all of the radials in the display area that do not terminate on the zone 2/zone 3 boundary are shown as traversing region 2, as they do in FIG. 2.

As noted in conjunction with FIG. 2, the repeating scan pattern may occur within angular segments as small as 0.1°. While it is impractical to illustrate this feature in FIG. 3, it is to be understood that repeating scan pattern in the offset mode that is implemented by the invention will occur within similar small angular segments.

When the values $x_{min}$=0, $y_{min}$=0 are implemented, the offset is zero, the invention still provides multiple azimuth processing of radar signals, but for rectangular displays rather than for circular displays.

The four resolution regions are not sufficient to provide a hole-free display for very large offsets. It is necessary to define a succession of finer resolution regions (32K, 64K, . . . ) if a perfectly hole-free display is needed at long ranges. It is often the case that a compromise is reached in terms of the quality of the display and the computing resources available. This technique is easily added to provide a range of acceptable display appearances.

As will be apparent to those skilled in the art, the algorithms may be readily converted by using the disclosed invention to support random-scanning radar systems with electronically steered as well as rotating antennas.

We claim:

1. A process for radar scan conversion of radar data based upon polar coordinates to radar data based upon rectangular coordinates in a programmable digital computer wherein said radar data based on polar coordinates is supplied to said digital computer and comprises antenna angle (θ) and echo amplitude range (r) data and said digital computer supplies radar data based on rectangular coordinates which control (x,y) defined pixels of a monitor with a display which has a variable azimuthal resolution that increases from the center of the display to the periphery of the display comprising:

(a) converting said data based on said polar coordinates to said data based on said rectangular coordinates in said digital computer under the control of a first software algorithm, and (b) generating data in said digital computer under the control of a second software algorithm which presents an aggregate radial scan pattern to said display that consists of a plurality of radials, each of which has active lengths that span one or more of a plurality of selected zones of said display so that said zones are defined such that a circular zone begins at the center of such display and extends through a first radius, and each of the other zones is a ring zone that is defined by a smaller radius and a larger radius so that as the zones extend further from the center of the display towards the periphery of the display the average azimuthal resolution associated with each zone increases as the radius increases, and the number of active radials that are generated on said display match the average azimuthal resolution of said display for each zone, and (c) offsetting said aggregate radial scan pattern so that it traverses a rectangular-shaped offset display that is defined relative to a rectangular-shaped non-offset display in which the location of the radar antenna is represented as being at the center of said rectangular-shaped non-offset display, and said offset display has a first display corner that is designed by $x_{min}$, $y_{min}$, and a second corner that is diagonally located from said first display corner and that is designated by $x_{max}$, $y_{max}$ where the amount of offset of said offset display is determined by the distance and direction that said display corners are located from said center of said rectangular-shaped, non-offset display.

2. A process as claimed in claim 1 wherein such aggregate radial scan pattern is generated under the control of said second software program such that the number of radials in each zone from the outermost zone to said circular zone has twice as many radials as its next innermost neighboring zone.

3. A radar scan conversion system for radar signal scan conversion of radar data based upon polar coordinates to radar data based upon rectangular coordinates comprising a digital computer, software program means and a monitor with a rectangular-shaped display, wherein said radar data based on polar coordinates is supplied to said digital computer and comprises antenna angle (θ) data and echo amplitude range (r) data and said digital computer supplies radar data based on rectangular coordinates to said display which control (x,y) defined pixels of said display, wherein said software program means comprises, a first software process which converts said data based on polar coordinates to said data based on rectangular coordinates, and a second software process which directs said digital computer to generate an aggregate radial scan pattern to said display in response to said data based on rectangular coordinates that consists of a plurality of radials, each of which has an active length that spans one or more of a plurality of selected zones of said display so that said zones are defined such that a circular zone begins at the center of such display and extends through a first radius, and each of the other zones is a ring zone that is defined by a smaller radius and a larger radius so that as the zones extend further from the center of the display towards the periphery of the display, the average azimuthal resolution associated with each zone increases as the radius increases, and the number of active radials that are generated on said display match the average azimuthal resolution of said display for each of said zones, and a third software process which directs said digital computer to offset said aggregate radial scan pattern so that it traverses a rectangular-shaped offset display that is defined relative to a rectangular-shaped, non-offset display in which the location of the radar antenna is represented as being at the center of said rectangular-shaped, non-offset display, and said offset display has a first display corner that is designated by $x_{min}$, $y_{min}$, and a second corner that is diagonally located from said first display corner and that is designated by $x_{max}$, $y_{max}$ where the amount of offset of said offset display, is determined by the distance and direction that said display corners are located from said center of said rectangular-shaped non-offset display.

4. A radar scan conversion system as claimed in claim 3 wherein such aggregate radial scan pattern is such that the number of radials in each zone from the outermost zone to said circular zone has twice as many radials as its next innermost neighboring zone.

5. In a programmable digital computer system which comprises a digital computer and a monitor with a rectangular-shaped display that is used to provide radar scan conversion for radar data based upon polar coordinates to radar data based upon rectangular coordinates, wherein said radar data based on polar coordinates is supplied to said digital computer and comprises antenna angle (θ) data and echo amplitude range (r) data and said digital computer supplies radar data based on rectangular coordinates to said display which control (x,y) defined pixels of said display, to the new use of said digital computer:

(a) to provide conversion of said radar data based on polar coordinates to said radar data based on rectangular coordinates under control of software, (b) to generate under control of software an aggregate radial scan pattern to said display that consists of a plurality of radials, each of which has an active length that spins one or more of a plurality of selected zones of said display so that said zones are defined such that a circular zone begins at the center of such display and extends through a first radius, and each of the other zones is a ring zone defined by a smaller radius and a larger radius so that as the zones extend further from the center of the display towards the periphery of the display the average azimuthal resolution associated with each zone increases as the radius increases, and the number of active radials that are generated on said display match the average azimuthal resolution of said display for each zone, and to offset said aggregate radial scan pattern so that it traverses a rectangular-shaped offset display that is defined relative to a rectangular-shaped, non-offset display in which said antenna center is at the center of said rectangular-shaped, non-offset display, and said offset display has a first display corner that is designed by $x_{min}$, $y_{min}$ and a second corner that is diagonally located from said first display corner and that is designated by $x_{max}$, $y_{max}$ where the amount of offset of said offset display is determined by the distance and direction that said display corners are located from said center of said rectangular-shaped, non-offset display.

6. In a digital computer system as claimed in claim 5, the further new use of said digital computer system to generate said aggregate radial scan pattern under the control of software such that the number of radials in each zone from the outermost zone to said circular zone is such that each zone has twice as many radials as its next innermost neighboring zone.

* * * * *

UNITED STATES PATENT AND TRADEMARK OFFICE
CERTIFICATE OF CORRECTION

PATENT NO. : 5,530,450
DATED : June 25, 1996
INVENTOR(S) : Stephen M. Sohn, Douglas A. Peterson It is certified that error appears in the above-indentified patent and that said Letters Patent is hereby corrected as shown below:

Column 4, line 29, "28" should be -- 20 -- .

Column 5, Table 1, line 3, before "$y_c$" insert -- $x_c$, -- .

Column 7, line 20, change "x" to -- $x_c$ -- .

Column 16, line 51, change "spins" to -- spans -- .

Signed and Sealed this

Seventeenth Day of September, 1996

Attest:

BRUCE LEHMAN

*Attesting Officer*   *Commissioner of Patents and Trademarks*